United States Patent Office 3,134,747
Patented May 26, 1964

3,134,747
RETARDATION OF CROSSLINKING IN THERMO-
PLASTIC POLYMERS OF ALKENYLAROMATIC
HYDROCARBONS HAVING NUCLEAR METHYL
SUBSTITUENTS WITH CHLORO OR BROMO
BENZENES
James L. Amos and Norman R. Ruffing, Midland, Mich.,
assignors to The Dow Chemical Company, Midland,
Mich., a corporation of Delaware
No Drawing. Filed Oct. 4, 1957, Ser. No. 688,113
6 Claims. (Cl. 260—45.7)

This invention relates to thermoplastic, soluble polymers of alkenylaromatic hydrocarbons having a nuclear methyl substituent, which polymers are ordinarily susceptible to the formation of crosslinkages and the formation of insoluble gels when subjected to heat. The invention pertains to a method and means for substantially retarding the formation of such crosslinkages and gels.

The polymers to which this invention is directed are addition polymers containing an appreciable proportion of at least one mono-alkenylaromatic hydrocarbon having one or more nuclear methyl groups. Illustrative of such compounds are ar-methylstyrene, e.g., o-, m-, and p-methylstyrene, ar,ar-dimethylstyrene, α,ar-dimethylstyrene, ar-ethyl-ar-methylstyrene, and ar-methylvinyl naphthalene, and mixtures thereof, representable by the formula $CH_3$—Q—alkenyl wherein the symbol —Q— represents an arylene hydrocarbon radical.

It is well known that such mono-alkenylaromatic hydrocarbons can be polymerized to obtain thermoplastic polymers that are soluble in solvents such as benzene and toluene. Such polymers can consist essentially of one or more of such mono-alkenylaromatic hydrocarbons, or they can be addition copolymers thereof with one or more other polymerizable mono-ethylenically unsaturated monomers such as styrene, α-methylstyrene, isobutylene, acrylonitrile, or lower alkyl acrylic-type esters such as methyl methacrylate or ethyl acrylate in which the major part, e.g. at least 50 percent by weight, is the mono-alkenylaromatic hydrocarbon or mixture.

It is also well known that such normally thermoplastic, soluble polymers are susceptible to the formation of crosslinkages and insoluble gels, particularly when these polymers are subjected to heat, as in the process of polymerization of the corresponding monomers in mass, or in the fabrication of the polymer products in a heat-plastified condition.

The problem can be illustrated by the following description of a typical procedure and its results.

A commercially available mixture of m-methylstyrene and p-methylstyrene was heated at 130° C. for 72 hours to obtain a solid thermoplastic polymer which was soluble in toluene. When heated to 240° C., the polymer softened and readily flowed under force of gravity. When this product was held at 240° C., its viscosity gradually increased (i.e. its fluidity decreased), until the product was no longer capable of flowing under the force of gravity. At this stage, the polymer was not thermoplastic and was insoluble in toluene.

It is understandable that this behavior is very objectionable since the properties, particularly the thermoplastic properties upon which moldability depends, are not stable in such a product but are subject to changes that can render the polymer product worthless for its intended purposes.

This behavior occurs even when the starting material consists essentially of mono-ethylenically unsaturated monomers, i.e. is free of poly-functional crosslinking agents such as divinylbenzene. The mechanism of the crosslinking reaction is not understood. It is suggested that the phenomenon of formation of crosslinkages in the nuclear methyl-substituted mono-alkenylaromatic hydrocarbon polymers with which this invention is concerned may involve activation of the methyl groups and formation of methylene bridges between polymer molecules, but this hypothesis is not essential to practice of the invention.

It is an object of this invention to provide a method and means for making thermoplastic, soluble addition polymers of mono-alkenylaromatic hydrocarbons having a nuclear methyl substituent, which polymers are substantially thermo-stable.

A more specific object is to provide such thermoplastic and soluble polymers which remain thermoplastic and soluble when heated at a heat-plastifying temperature.

In another form of expression, it is an object of this invention to provide a method and means for substantially retarding the formation of crosslinkages and gels in thermoplastic, soluble addition polymers of mono-alkenylaromatic hydrocarbons having a nuclear methyl substituent when such polymers are subjected to heat.

Other objects and advantages of the invention will be apparent in the following description.

The objects of this invention have been attained by incorporating into a thermoplastic, soluble addition polymer of a mono-alkenylaromatic hydrocarbon having a nuclear methyl substituent a small but effective proportion of an aromatic compound stabilizer having from one to four nuclear substituents and selected from the class of aromatic hydrocarbons having at least two carbon atoms in at least one alkyl group and nuclearly halogenated aromatic hydrocarbons. The aromatic compound stabilizers are representable by the formula $$AR—X_n$$

wherein the symbol AR represents an aromatic nucleus having at least one benzene ring such as a benzene, naphthalene, or biphenyl nucleus, the symbol X represents a halogen, e.g. fluorine, chlorine, bromine, or iodine, or an alkyl group such as methyl, ethyl, propyl or the like, and $n$ is a numeral from 1 to 4, and wherein —$X_n$ contains at least two carbon atoms when the compound is a hydrocarbon.

Specific compounds which are effective stabilizers for the purposes of this invention are chlorobenzene, the dichlorobenzenes, the trichlorobenzenes, tetrachlorobenzene, bromobenzene, the dibromobenzenes, bromonaphthalene, chlorobiphenyl, bromobiphenyl, iodobenzene, ar-chlorotoluenes, ar-chloroxylenes, ar-chloromesitylene, ar-dichloroethylbenzene, ar-dichlorodiethylbenzene, xylene, ethylbenzene, diethylbenzene, ethylfluorobenzene, ethyltoluene, and diisopropylbenzene. Understandably, these individual stabilizers are not equally effective or desirable in all respects. The preferred agents are bromobenzene, dichlorobenzene, and ar-dichloroethylbenzene.

The stabilizer agent is advantageously incorporated in the thermoplastic, soluble polymer composition in amounts corresponding to from 0.1 to 25, preferably from 0.5 to 15, parts by weight of the whole composition, the optimum amount being a matter of choice depending, inter alia, upon the effectiveness of the specific stabilizer, the magnitude of the problem presented by the particular polymeric material, and the degree of stabilization desired.

Although the stabilizer can be incorporated into the polymer composition at any stage where the polymer is still thermoplastic and soluble, the stabilizer is preferably incorporated into the monomer-containing composition prior to or during the polymerization step in order to obtain the maximum degree of effectiveness of the stabilizer.

When a thermoplastic, soluble polymer, containing a stabilizer as just described, is heated under conditions where the non-stabilized polymer itself ordinarily cross-links and becomes non-thermoplastic and insoluble, the stabilized polymer composition retains its thermoplasticity and solubility. The compositions stabilized in accordance with this invention are, therefore, useful and advantageous under conditions where the corresponding non-stabilized compositions fail and become useless by mutation to intractable products.

The following examples illustrate the invention but should not be construed as limiting its scope.

EXAMPLE 1

A sample, identified as sample A, of ar-methylstyrene (approximately 65 percent by weight m-methylstyrene and approximately 35 percent by weight p-methylstyrene) was placed in a glass ampoule.

Another sample, identified as sample B, of the same kind of ar-methylstyrene mixture containing 10 percent by weight of o-dichlorobenzene was placed in another glass ampoule. The charges of the samples were approximately one-half of the capacity of the ampoules.

After air was flushed from the ampoules with a nitrogen gas stream, the ampoules were sealed and placed in a heated chamber at approximately 130° C. After 72 hours, the polymerization of monomeric materials was substantially complete.

The ampoules containing polymerized ar-methylstyrene were then placed in an upright position in an oven at 240° C. At such temperature, the polymer samples became heat-plastified and flowed to the lower end of the ampoules under force of gravity. At 24-hour intervals, the ampoules were inverted to put the polymer samples at the top of the ampoules.

In a five-day period, the non-stabilized polymer sample A became progressively more viscous. On the fifth day, the polymer sample A was incapable of flowing under force of gravity at 240° C. Examination of the resulting polymer material showed that it contained gelatinous matter and was insoluble in toluene.

In contrast thereto, polymer sample B, containing stabilizer, remained fluid and continued to flow under force of gravity at 240° C. without appreciable increase in viscosity for more than 40 days. After 48 days at 240° C., sample B stopped flowing under force of gravity.

EXAMPLE 2

Samples of ar-methylstyrene containing 65 percent by weight m-methylstyrene and 35 percent by weight p-methylstyrene were placed in glass ampoules. Sample A contained no added stabilizer, sample B contained 0.5 percent by weight of bromobenzene, and sample C contained 1.0 percent by weight of bromobenzene. Each ampoule contained a charge of approximately one-half its capacity. After the air was flushed from the ampoules with nitrogen, the ampoules were sealed and heated to 130° C. for one day and thereafter at 150° C. for one day, thereby substantially polymerizing the starting monomeric ar-methylstyrene.

The ampoules of polymer were placed in an upright position in an oven at 240° C. and inverted at 24-hour intervals as described in Example 1, to observe the flowability of the heat-plastified polymer. The number of days at 240° C. before the samples ceased flowing under force of gravity are shown below in Table 1.

Table 1

| Sample | Stabilizer by Weight | Days at 240° C. to Non-flowability |
|---|---|---|
| A | none | 3 |
| B | 0.5 percent Bromobenzene | 17 |
| C | 1.0 percent Bromobenzene | 214 |

Example 3

In a manner similar to the standard procedure described in Examples 1 and 2, other agents were tested as stabilizers, and the results are set forth in Table 2. The tests were carried out with a number of different lots of a commercial grade of ar-methylstyrene containing approximately 65 percent by weight of m-methylstyrene and approximately 35 percent by weight of p-methylstyrene. In each instance where a stabilizer was tested, a parallel test of the same ar-methylstyrene starting material without stabilizer was carried out simultaneously.

Table 2

| Stabilizer, Percent by Weight | Days at 240° C. to Non-flowability | |
|---|---|---|
| | Without [1] Stabilizer | With Stabilizer |
| 5% Chlorobenzene | 1 | 5 |
| 5% o-Dichlorobenzene | 5 | 29 |
| 5% p-Dichlorobenzene | 5 | 13 |
| 5% 1,2,4-Trichlorobenzene | 1 | 5 |
| 5% x-Tetrachlorobenzene | 3 | 7 |
| 5% Iodobenzene | 3 | >14 |
| 5% p-Dibromobenzene | 3 | >14 |
| 5% x-Bromobiphenyl | 3 | >23 |
| 5% x-Chlorobiphenyl | 5 | 21 |
| 5% ar-Chloromesitylene | 3 | 24 |
| 5% Ethylfluorobenzene | 3 | 5 |
| 5% Ethylbenzene | 1 | 2 |
| 10% Ethylbenzene | 1 | 3 |
| 15% Ethylbenzene | 1 | 4 |
| 5% Diethylbenzene | 1 | 2 |
| 10% Diethylbenzene | 1 | 3 |
| 15% Diethylbenzene | 1 | 5 |
| 5% Diisopropylbenzene | 3 | 6 |
| 5% Ethyltoluene | 1 | 3 |
| 15% ar-Dichloroethylbenzene | 5 | 65 |
| 5% ar-Dichlorodiethylbenzene | 3 | 20 |
| 2% Mixture—<br>97.5% o-dichlorobenzene<br>2.5% p-dichlorobenzene | 5 | 57 |
| 5% Mixture—<br>97.5% o-dichlorobenzene<br>2.5% p-dichlorobenzene | 5 | 66 |

[1] The variation in time to produce non-flowability of the non-stabilized samples is presumably due to minor differences in the composition, quality or previous history of the different lots of starting material.

In place of the ar-methylstyrene employed in the foregoing examples there can be employed another mono-alkenyl-aromatic hydrocarbon having a nuclear methyl substituent as hereinbefore defined with substantially the same results.

Instead of incorporating the stabilizer in the monomeric polymerizable material and preparing the polymer in the presence of such stabilizer, the stabilizer can be incorporated into the unstable polymer after polymerization, provided that the stabilizer is added to the polymer while the latter is still in a thermoplastic, soluble condition. The stabilizers of this invention are not generally effective in restoring a crosslinked, infusible, insoluble resin to a thermoplastic, soluble condition.

That which is claimed is:

1. A method of stabilizing thermoplastic, soluble addition polymers of mono-alkenylaromatic hydrocarbons having a nuclear methyl substituent against formation of cross-linkages and loss of solubility and thermoplasticity at heat-plastifying temperatures by incorporating in such thermoplastic, soluble polymers from 0.1 to 25 percent by weight based on the whole composition of bromobenzene.

2. A method of stabilizing thermoplastic, soluble addition polymers of mono-alkenylaromatic hydrocarbons having a nuclear methyl substituent against formation of cross-linkages and loss of solubility and thermoplasticity at heat-plastifying temperatures by incorporating in such thermoplastic, soluble polymers from 0.1 to 25 percent by weight based on the whole composition of o-dichlorobenzene.

3. A method of stabilizing thermoplastic, soluble addition polymers of ar-methylstyrene against formation of crosslinkages and loss of solubility and thermoplasticity at heat-plastifying temperatures by incorporating in such thermoplastic, soluble polymers from 0.1 to 15 percent by weight based on the whole composition of bromobenzene.

4. A method of stabilizing thermoplastic, soluble addition polymers of ar-methylstyrene against formation of crosslinkages and loss of solubility and thermoplasticity at heat-plastifying temperatures by incorporating in such thermoplastic, soluble polymers from 1 to 25 percent by weight based on the whole composition of o-dichlorobenzene.

5. A method of stabilizing thermoplastic, soluble addition polymers of ar-methylstyrene against formation of crosslinkages and loss of solubility and thermoplasticity at heat-plastifying temperatures by incorporating therein from 0.1 to 15 percent by weight based on the whole composition of bromobenzene by adding the same to a corresponding monomer composition comprising ar-methylstyrene prior to complete polymerization thereof to a thermoplastic, soluble polymer.

6. A method of stabilizing thermoplastic, soluble addition polymers of ar-methylstyrene against formation of crosslinkages and loss of solubility and thermoplasticity at heat-plastifying temperatures by incorporating therein from 1 to 25 percent by weight based on the whole composition of o-dichlorobenzene by adding the same to a corresponding monomer composition comprising ar-methylstyrene prior to complete polymerization thereof to a thermoplastic, soluble polymer.

References Cited in the file of this patent

UNITED STATES PATENTS

| | | |
|---|---|---|
| 2,676,927 | McCurdy et al. | Apr. 27, 1954 |
| 2,676,946 | McCurdy et al. | Apr. 27, 1954 |
| 2,740,161 | Rubens et al. | Apr. 3, 1956 |
| 2,823,201 | Wheaton | Feb. 11, 1958 |